(12) United States Patent
Brillon et al.

(10) Patent No.: US 12,179,771 B2
(45) Date of Patent: Dec. 31, 2024

(54) METHOD FOR MANAGING LOCATION OF A USER DEVICE IN A PASSENGER COMPARTMENT OF A VEHICLE

(71) Applicant: Continental Automotive GmbH, Hannover (DE)

(72) Inventors: Alain Brillon, Toulouse (FR); Isabelle Bacaer, Toulouse (FR); Stéphane Charbonnier, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 206 days.

(21) Appl. No.: 17/978,505

(22) Filed: Nov. 1, 2022

(65) Prior Publication Data

US 2023/0182746 A1 Jun. 15, 2023

(30) Foreign Application Priority Data

Dec. 10, 2021 (FR) ...................................... 2113257

(51) Int. Cl.
*B60W 40/08* (2012.01)
(52) U.S. Cl.
CPC ..... *B60W 40/08* (2013.01); *B60W 2040/0881* (2013.01); *B60W 2540/215* (2020.02); *B60W 2540/227* (2020.02)
(58) Field of Classification Search
CPC ........... B60W 40/08; B60W 2540/227; B60W 2540/215; B60W 2540/0881
See application file for complete search history.

(56) References Cited

U.S. PATENT DOCUMENTS

| | | | |
|---|---|---|---|
| 2015/0208207 A1 | 7/2015 | Ye et al. | |
| 2022/0410906 A1* | 12/2022 | Isaac | G06N 20/20 |
| 2023/0027582 A1* | 1/2023 | Meidan | G01S 5/06 |
| 2023/0099551 A1* | 3/2023 | Gupta | H04W 4/026 |
| | | | 701/36 |
| 2023/0111748 A1* | 4/2023 | Park | B60R 16/037 |
| | | | 340/573.1 |

OTHER PUBLICATIONS

French Search Report and Written Opinion for French Application No. 2113257, dated Jul. 15, 2022, with translation, 1 10 pages.

\* cited by examiner

*Primary Examiner* — Aaron L Troost
(74) *Attorney, Agent, or Firm* — Buchanan Ingersoll & Rooney PC

(57) ABSTRACT

A method for managing location of a user device in a passenger compartment of a vehicle is disclosed. The method includes calculating the distance of the user device in relation to each of the transceivers from the received response signals; calculating, for each transceiver, the difference between the calculated distance between the transceiver and the user device and the distance between the transceiver and the user device that was previously used to determine the position of the user device in the passenger compartment. When one of the differences calculated in relation to one of the transceivers is erroneous by being higher than a predetermined "inconsistency threshold", the method then calculates the positional variation of the user device from the received response signals by excluding the response signal received for the transceiver.

11 Claims, 3 Drawing Sheets

METHOD FOR MANAGING LOCATION OF A USER DEVICE IN A PASSENGER COMPARTMENT OF A VEHICLE

CROSS REFERENCE TO RELATED APPLICATIONS

This application claims priority to French Patent Application No. 2113257, filed Dec. 10, 2021, the contents of such application being incorporated by reference herein.

FIELD OF THE INVENTION

The present invention pertains to the automotive field and relates more particularly to a method for managing location of a user device in a passenger compartment of a vehicle.

BACKGROUND OF THE INVENTION

In a motor vehicle, it is known practice to locate, that is to say to determine the position of, a user device, for example a badge or a smartphone, inside the vehicle in order to authorize activation of the driving systems and starting of the engine.

In a known manner, location is performed from transceivers mounted in the vehicle, on the bodywork or in the passenger compartment, for example numbering six or eight. To this end, the user device first transmits an acknowledgement message in a "polling" mode. Next, on reception, each transceiver responds by transmitting a request signal comprising its identifier to the user device, which responds to each transceiver by sending a dedicated response signal comprising the identifier of said transceiver. In general, the transceivers send their request signal alternately so that the user device sends the response signals alternately also.

On receiving the response signal comprising its identifier, each transceiver calculates the total time of flight of the request signal and of the response signal or else determines the power of the received response signal in order to determine the distance between said transceiver and the user device. An electronic control unit aboard the vehicle then uses the distances calculated by each transceiver to estimate the location of the user device, for example by triangulation or any other suitable method.

In the majority of existing solutions, the signals are transmitted in a low frequency band (LF), lower than 300 kHz, or else at radio frequencies (RF), of the order of 433 MHZ. At these frequencies, the signals rebound little from objects, with the exception of large metallic masses, for example, and in particular pass through the human body. Consequently, the request and response signals are deflected little.

However, as the automotive industry follows technological developments, one of the current trends proposes using signals in higher frequency bands, in particular of ultra-wideband (UWB) type between 6 Ghz and 10 Ghz, in order to improve the accuracy of location and to thus propose triggering more functions, and functions that are more personalized.

Doing this means that these high-frequency signals may be more easily reflected by objects and by the human body. Thus, a reflected signal will follow a longer path that will distort calculation of the distance and therefore location of the user device, which has a major drawback if the user device is located as being outside the passenger compartment while it is inside the passenger compartment, thus preventing the systems and the engine of the vehicle from being started.

Therefore, there is a need for a solution allowing these drawbacks to be at least partially overcome.

SUMMARY OF THE INVENTION

To this end, an aspect of the invention first of all relates to a method for managing location of a user device in a passenger compartment of a vehicle, said vehicle comprising a plurality of transceivers, said method comprising, the position of the user device having previously been determined in the passenger compartment of the vehicle from the distances between each transceiver and the user device, the following steps implemented by the vehicle:

receiving, by way of each transceiver, a request signal transmitted by the user device, said request signal comprising the identifier of the user device, transmitting to the user device, by way of each transceiver, a response signal comprising the identifier of said transceiver, receiving, by way of each transceiver, a location signal transmitted by the user device and comprising the identifier of the user device and the identifier of said transceiver, calculating the distance of the user device in relation to each of the transceivers from the received response signals, calculating, for each transceiver, the difference between the distance between said transceiver and the user device that has been calculated and the distance between said transceiver and the user device that was previously used to determine the position of the user device in the passenger compartment, when one of the differences calculated in relation to one of the transceivers is erroneous by being higher than a predetermined "inconsistency" threshold, calculating the position of the user device from the received response signals by excluding the response signal received for said transceiver, calculating the positional variation of the user device between the calculated position and the previously determined position, when the calculated positional variation is higher than a predetermined "movement detection" threshold, calculating the position of the user device from the received response signals by including all of the received response signals.

The method according to an aspect of the invention thus makes it possible to prevent false detection of the user device outside the passenger compartment while the user device is still in the passenger compartment by removing the incorrect signal to determine the variation in the position of the user device.

Preferably, the positional variation is calculated by calculating the Euclidean distance between the previously determined position and the calculated position.

Advantageously, when the erroneous distance is lower than the predetermined inconsistency threshold and the positional variation is higher than a "movement detection" threshold, the position of the user device is calculated from the full complement of the received response signals.

More advantageously, when the positional variation is lower than a predetermined "movement detection" threshold, the user device is kept at the previously determined position in the passenger compartment of the vehicle without calculating the position of the user device. Thus, the only calculation of the positional variation allows the position to be kept in the vehicle, in particular in order to authorize starting of the vehicle.

According to one aspect of the invention, the signals have a frequency higher than 1 GHZ.

Preferably, the frequency of the signals is between 6 and 10 GHz.

Preferably, the signals are of UWB (ultra-wideband) type.

According to one aspect of the invention, the position of the user device is calculated by using the time of flight of the signals transmitted by the transceivers or the power of the signals received from the user device by the transceivers.

Preferably, the inconsistency threshold is of the order of 30 cm, which allows reliable detection of an error on one of the response signals.

More preferably, the movement detection threshold is of the order of 10 cm, which is a reliable threshold below which the user device may be considered to be static, for example in order to keep the authorization to start the vehicle.

An aspect of the invention also relates to a computer program product characterized in that it comprises a set of program code instructions that, when executed by one or more processors, configure the one or more processors to implement a method as presented hereinabove.

An aspect of the invention also relates to an electronic control unit for a motor vehicle, said electronic control unit being configured to:
- control the transmission, by way of each transceiver, of a request signal to a user device, said request signal comprising the identifier of the transceiver,
- calculate the distance of the user device in relation to each of the transceivers from response signals transmitted by the user device and received by each transceiver, each response signal comprising the identifier of the user device and the identifier of said transceiver,
- calculate, for each transceiver, the difference between the distance between said transceiver and the user device that has been calculated and the distance between said transceiver and the user device that was previously used to determine the position of the user device in the passenger compartment,
- when one of the differences calculated in relation to one of the transceivers is erroneous by being higher than a predetermined "inconsistency" threshold, calculate the position of the user device from the received response signals by excluding the response signal received for said transceiver,
- calculate the positional variation of the user device between the calculated position and the previously determined position,
- when the calculated positional variation is higher than a predetermined "movement detection" threshold, calculate the position of the user device from the received response signals by including all of the received response signals.

An aspect of the invention also relates to a motor vehicle comprising a plurality of transceivers and an electronic control unit as presented hereinabove.

An aspect of the invention also relates to a system comprising a vehicle as presented above and a user device, said user device being configured to:
- transmit, for example periodically, a request signal,
- receive response signals sent by the transceivers one after the other,
- transmit a location signal to each transceiver, said location signal comprising the identifier of said transceiver.

BRIEF DESCRIPTION OF THE DRAWINGS

Other features and advantages of aspects of the invention will become more clearly apparent on reading the description that follows. This description is purely illustrative and should be read with reference to the appended drawings, in which.

DETAILED DESCRIPTION OF THE PREFERRED EMBODIMENTS

Figure 1:
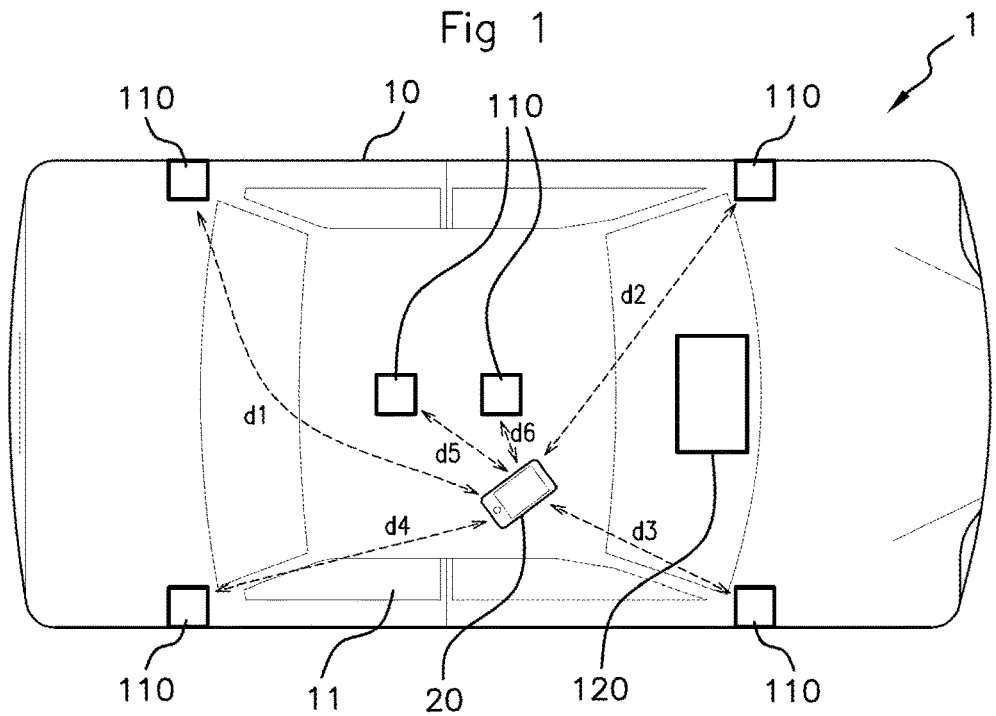
FIG. 1 schematically shows one embodiment of the system according to the invention.
Figure 2:
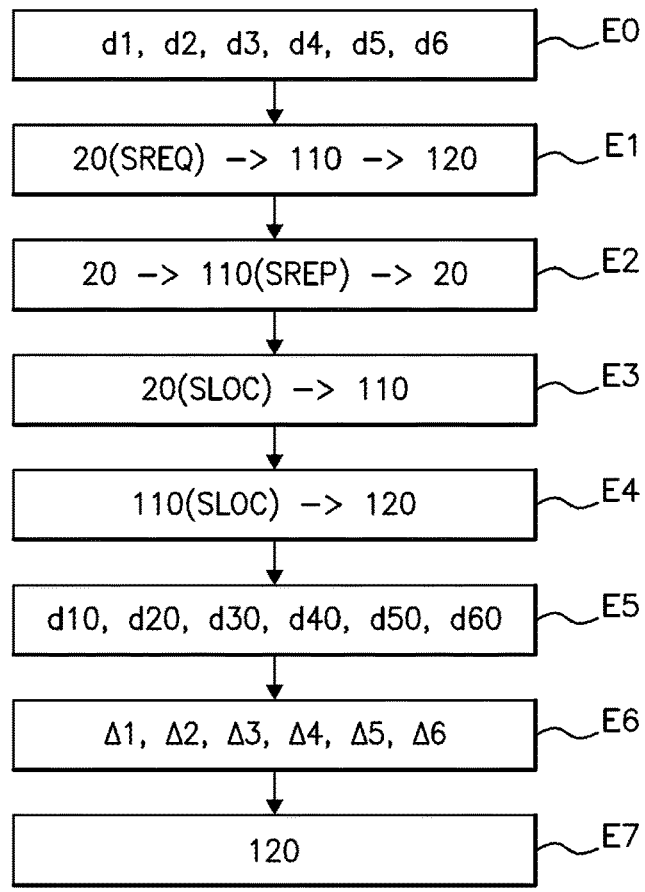
FIG. 2 schematically shows one embodiment of the method according to the invention.

FIG. 1 shows one example of a system 1 according to the invention.

System 1

The system 1 comprises a motor vehicle 10 and a user device 20.

Vehicle 10

The vehicle 10 comprises a plurality of transceivers 110 and an electronic control unit 120. In this example, the vehicle 10 comprises six transceivers 110: four external transceivers 110 mounted outside the passenger compartment 11, for example on or in the bodywork, and two internal transceivers 110 mounted in the passenger compartment 11, without this limiting the scope of the present invention. Indeed, in another embodiment, the vehicle 10 could comprise more or fewer than six transceivers 110, preferably at least three in order to determine the position of the user device 20 by triangulation.

Transceiver 110

Each transceiver 110 is configured to receive a request signal SREQ transmitted by the user device 20, said request signal SREQ comprising the identifier of said user device 20.

Each transceiver 110 is configured to transmit to the user device 20, at the command of the electronic control unit 20, a response signal SREP comprising the identifier of said transceiver 110 and possibly the identifier of the user device 20 received in the request signal.

Each transceiver 110 is configured to receive a location signal SLOC transmitted by the user device 20 and comprising the identifier of the user device 20 and the identifier of said transceiver 110.

Each transceiver 110 is configured to convey the received location signals SLOC to the electronic control unit 120 in order to estimate the distance between said transceiver 110 and the user device 20, as will be described below.

Preferably, each transceiver 110 is configured to transmit and receive the signals in a frequency band of UWB (ultra-wideband) type between 6 and 10 GHz.

Electronic control unit 120

The electronic control unit 120 is configured to control the transmission, by way of each transceiver 110, of a request signal SREQ to the user device 20, said request signal SREQ comprising the identifier of the transceiver 110 transmitting it.

The electronic control unit 120 is configured to calculate the distance of the user device 20 in relation to each of the transceivers 110 from response signals SREP transmitted by the user device 20 and received by each transceiver 110, each response signal comprising the identifier of the user device 20 and the identifier of said transceiver 110.

The electronic control unit 120 is configured to calculate, for each transceiver 110, the difference between the distance between said transceiver 110 and the user device 20 that has been calculated and the last distance between said transceiver 110 and the user device 20 that was previously determined in order to determine the position of the user device 20 in the passenger compartment 11.

The electronic control unit 120 is configured so as, when one of the distances calculated in relation to one of the transceivers 110 is higher than a predetermined "inconsistency" threshold, to calculate the position of the user device 20 from the received response signals by excluding the response signal received for said erroneous transceiver 110.

The position of the user device 20 may be determined by the electronic control unit 120 by using the time of flight of the request SREQ and response SREP signals or the power of the response signals SREP, in a manner known per se, for example by triangulation, by using a neural network or any other suitable known method.

The electronic control unit 120 comprises a processor (not shown) that is able to implement a set of instructions allowing these functions to be performed.

User device 20

The user device 20 is configured to transmit, for example periodically, a request signal SREQ to the transceivers 110, said request signal SREQ comprising the identifier of said user device 20.

The user device 20 is configured to receive from each transceiver 110, in response to the transmitted request signal, a response signal SREP comprising the identifier of said transceiver 110 and possibly the identifier of the user device 20.

The user device 20 is configured to transmit, to each transceiver 110, a location signal SLOC comprising the identifier of the user device 20 and the identifier of said transceiver 110 received in a response signal SREP.

The user device 20 is preferably of smartphone type or any suitable device.

Exemplary implementation of the invention

One exemplary implementation of the method according to the invention will now be presented with reference to FIGS. 2 to 5.

In a preliminary step E0, the position of the user device 20 is first determined in the passenger compartment 11 of the vehicle 10, for example as illustrated in FIG. 1, by the electronic control unit 120 from the distances d1, d2, d3, d4, d5, d6 between each transceiver 110 and the user device 20, for example by using the time of flight or the power of the signals.

In this preliminary step, in order to clarify the invention, the signals allowing determination of the distances between each transceiver 110 and the user device 20 are considered not to have been affected by an obstacle. To put it another way, the position of the user device 20 as determined by the electronic control unit 120 is considered to be exact. For the rest, the response signal SREP received by one of the transceivers 110 is considered to be reflected by an obstacle, for example the body of the driver or of a passenger or else a suitcase or a related metal object, so that the distance calculated from this signal between said transceiver 110 and the user device 20 is wrong.

Figure 3:
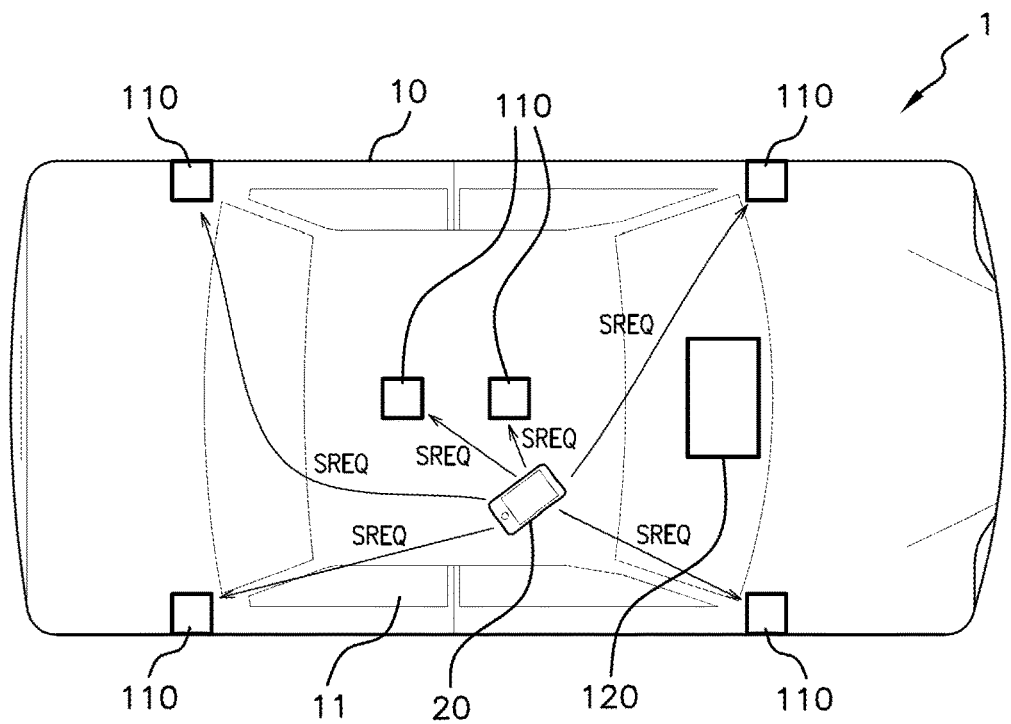
FIG. 3 schematically shows the system during a step of transmitting request signals by way of the user device in the embodiment of FIG. 2.

Referring to FIG. 3, the user device 20 transmits, for example periodically, a request signal SREQ comprising the identifier of said user device 20 to the transceivers 110, which receive it and convey it to the electronic control unit 120 in a step E1.

Figure 4:
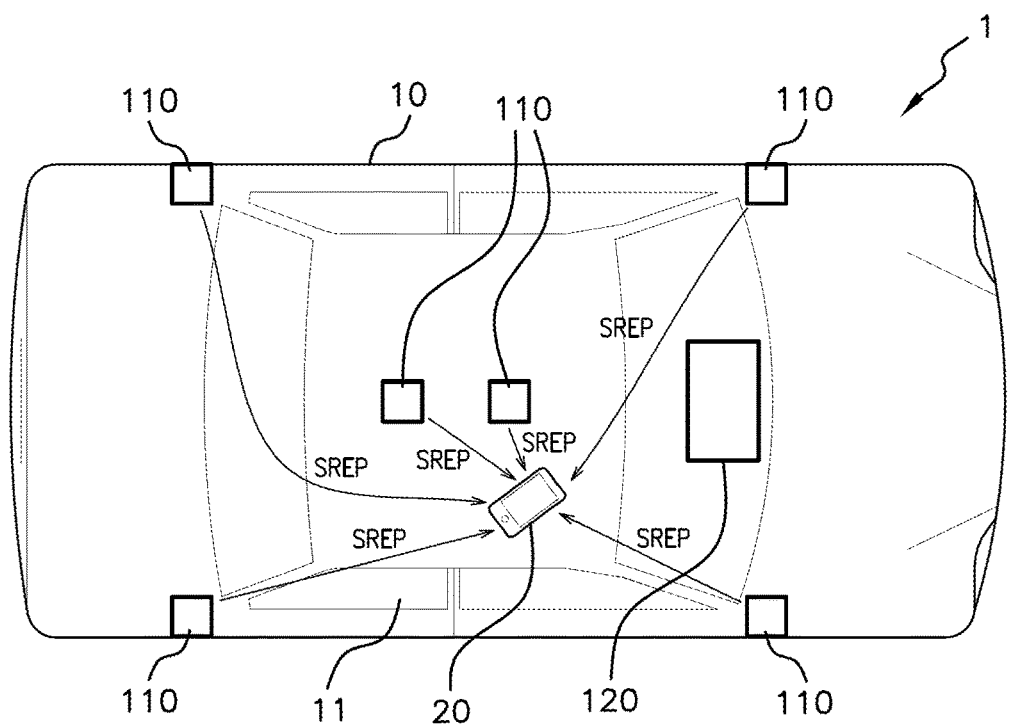
FIG. 4 schematically shows the system during a step of receiving, by way of the user device, response signals transmitted by the transceivers in the embodiment of FIG. 2.

Referring to FIG. 4, the electronic control unit 120 orders the transmission, by each of the transceivers 110 and in staggered (or successive) fashion, of a response signal SREP to the user device 20, which receives it in a step E2, said response signal SREP comprising the identifier of the transceiver 110 that transmits it and the identifier of the user device 20 in order to prove to the user device 20 that it has indeed first received the request signal SREQ.

Figure 5:
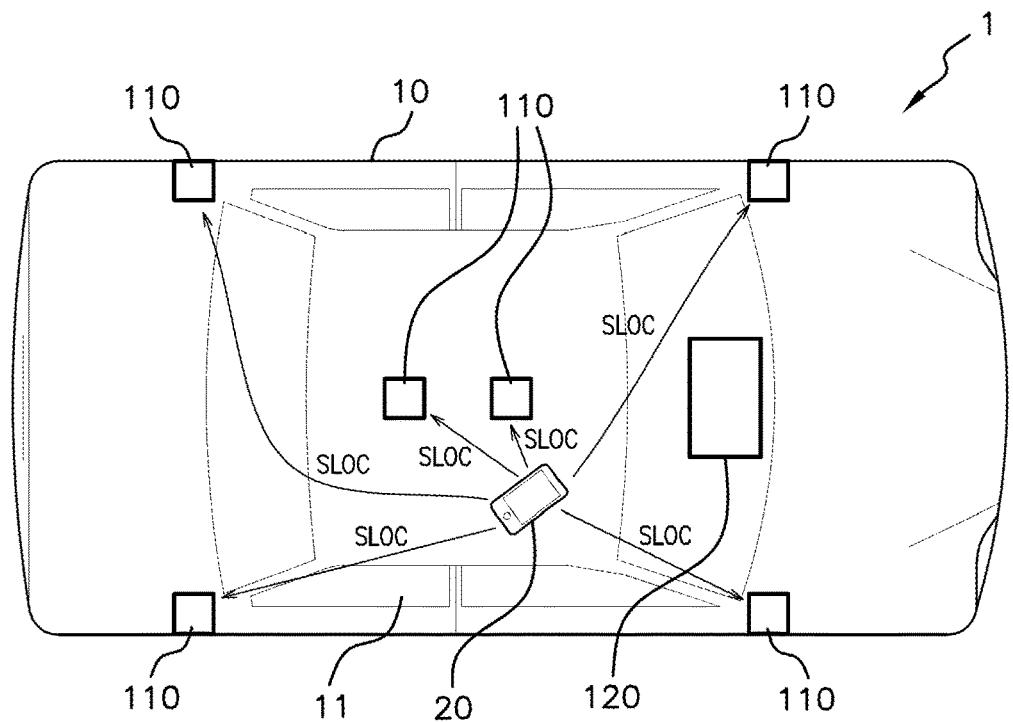
FIG. 5 schematically shows the system during a step of transmitting location signals by way of the user device in the embodiment of FIG. 2.

The user device 20 receives the response signals SREP sent by the transceivers 110 one after the other and then, in a step E3, transmits a location signal SLOC to each transceiver 110 as illustrated in FIG. 5, said location signal SLOC comprising the identifier of said transceiver 110. Each transceiver 110 thus receives a location signal SLOC comprising its own identifier and then transmits said location signal SLOC to the electronic control unit 120 in a step E4.

In a step E5, the electronic control unit 120 determines the distance d10, d20, d30, d40, d50, d60 of the user device 20 in relation to each of the transceivers 110 from the location signals SLOC received by each transceiver 110, the identifier of each transceiver 110 allowing the electronic control unit 120 to associate each received location signal SLOC and therefore each determined distance d10, d20, d30, d40, d50, d60 with one, and only one, transceiver 110, for each of the transceivers 110.

Next, in a step E6, the electronic control unit 120 calculates, for each transceiver 110, the difference Δ10, Δ20, Δ30, Δ40, Δ50, Δ60 between the distance d10, d20, d30, d40, d50, d60 between said transceiver 110 and the user device 20 that has been calculated and the distance d1, d2, d3, d4, d5, d6 between said transceiver 110 and the user device 20 that was previously used to determine the last position of the user device 20 in the passenger compartment 11 in step E0.

Figure 6:
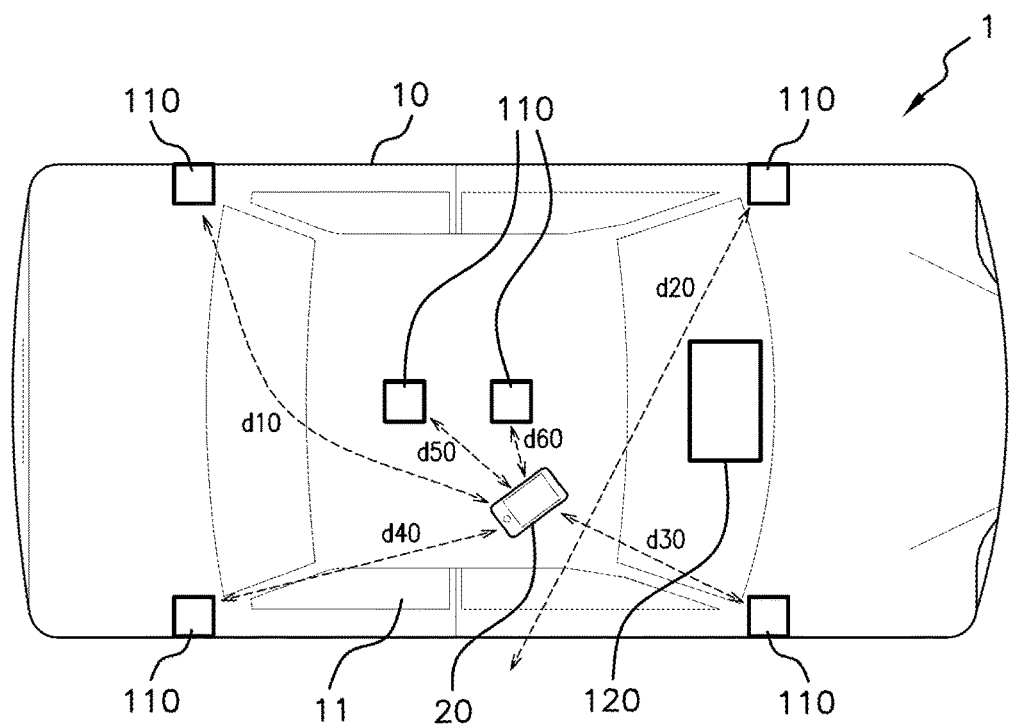
FIG. 6 schematically shows the system during determination of an erroneous distance for one of the transceivers.

When one of the differences Δ10, Δ20, 30, Δ40, 450, 60 calculated in relation to one of the transceivers 110 is higher than the predetermined inconsistency threshold, for example 30 cm, that is to say that the determined distance is erroneous due to the presence of an object or body that has changed the trajectory of the corresponding location signal SLOC, for example distance d20 in the example of FIG. 6, the electronic control unit 120 calculates the variation in the position of the user device 20 from the received location signals SLOC in a step E7 by excluding the location signal SLOC received for said transceiver 110 associated with the distance d20, so as not to include it in the calculation, as the distance d20 estimated for this transceiver 110 is distorted. In this particular case, in the example of FIG. 6, the erroneous distance d20 means that the user device 20 is detected to be outside the vehicle 10, which is wrong.

When the positional variation of the user device 20 is between the inconsistency threshold and the movement detection threshold, that is to say that the user device 20 moves slightly, the electronic control unit 120 recalculates the position of the user device 20 from the full complement of the received response signals. Indeed, in this case, the inaccuracy of the determination of the distance d20 is considered not to affect location of the user device 20. The new position allows determination of whether the user device 20 is still located as being in the passenger compartment 11 of the vehicle 10 or whether it has moved.

When the positional variation of the user device 20 is lower than the movement detection threshold, for example 10 cm, the electronic control unit 120 keeps locating the user device 20 as being at the previously determined position in the passenger compartment 11 of the vehicle 10 in step E0, for example in order to keep the authorization to start the vehicle.

The invention claimed is:

1. A method for managing location of a user device in a passenger compartment of a vehicle, said vehicle comprising a plurality of transceivers, a position of the user device having previously been determined in the passenger compartment of the vehicle from distances between each transceiver and the user device, the method comprising the following steps implemented by the vehicle:
   receiving, by way of each transceiver, a request signal transmitted by the user device, said request signal comprising an identifier of the user device,
   transmitting to the user device, by way of each transceiver, a response signal comprising an identifier of said transceiver,
   receiving, by way of each transceiver, a location signal transmitted by the user device and comprising the identifier of the user device and the identifier of said transceiver,
   calculating the distance of the user device in relation to each of the transceivers from the received response signals,
   calculating, for each transceiver, the difference between the distance between said transceiver and the user device that has been calculated and the distance between said transceiver and the user device that was previously used to determine the position of the user device in the passenger compartment,
   when one of the differences calculated in relation to one of the transceivers is erroneous by being higher than a predetermined inconsistency threshold, calculating the position of the user device from the received response signals by excluding the response signal received for said transceiver,
   calculating the positional variation of the user device between the calculated position and the previously determined position,
   when the calculated positional variation is higher than a predetermined movement detection threshold, calculating the position of the user device from the received response signals by including all of the received response signals.

2. The method as claimed in claim 1, wherein, when the erroneous distance is lower than the predetermined inconsistency threshold and the positional variation is higher than a movement detection threshold, the position of the user device is calculated from the full complement of the received response signals.

3. The method as claimed in claim 1, wherein, when the calculated positional variation is lower than a predetermined movement detection threshold, the user device is kept at the previously determined position in the passenger compartment of the vehicle without calculating the position of the user device.

4. The method as claimed in claim 1, wherein the signals have a frequency higher than 1 GHZ.

5. The method as claimed in claim 1, wherein the inconsistency threshold is of the order of 30 cm.

6. The method as claimed in claim 1, wherein the movement detection threshold is of the order of 10 cm.

7. A non-transitory computer program product, comprising a set of program code instructions that, when executed by one or more processors, configure the one or more processors to implement a method as claimed in claim 1.

8. An electronic control unit for a motor vehicle, said electronic control unit being configured to:
   control the transmission, by way of each transceiver, of a request signal to a user device, said request signal comprising the identifier of the transceiver,
   calculate the distance of the user device in relation to each of the transceivers from response signals transmitted by the user device and received by each transceiver, each response signal comprising the identifier of the user device and the identifier of said transceiver,
   calculate, for each transceiver, the difference between the distance between said transceiver and the user device that has been calculated and the distance between said transceiver and the user device that was previously used to determine the position of the user device in the passenger compartment,
   when one of the differences calculated in relation to one of the transceivers is erroneous by being higher than a predetermined inconsistency threshold, calculate the position of the user device from the received response signals by excluding the response signal received for said transceiver,
   calculate the positional variation of the user device between the calculated position and the previously determined position,
   when the calculated positional variation is higher than a predetermined movement detection threshold, calculate the position of the user device from the received response signals by including all of the received response signals.

9. A motor vehicle comprising a plurality of transceivers and an electronic control unit as claimed in claim 8.

10. A system comprising a vehicle as claimed in claim 9 and a user device, said user device being configured to:
    transmit a request signal,
    receive response signals sent by the transceivers one after the other,
    transmit a location signal to each transceiver, said location signal comprising the identifier of said transceiver.

11. The system according to claim 10, wherein the request signal is transmitted periodically.

* * * * *